United States Patent
Ichikawa

(10) Patent No.: US 9,840,186 B2
(45) Date of Patent: Dec. 12, 2017

(54) VEHICLE LAMP

(71) Applicant: KOITO MANUFACTURING CO., LTD., Minato-ku, Tokyo (JP)

(72) Inventor: Tomoyuki Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/091,970

(22) Filed: Apr. 6, 2016

(65) Prior Publication Data

US 2016/0297351 A1   Oct. 13, 2016

(30) Foreign Application Priority Data

Apr. 7, 2015 (JP) ................................ 2015-078686

(51) Int. Cl.
*B60Q 1/02*  (2006.01)
*B60Q 1/14*  (2006.01)

(52) U.S. Cl.
CPC ........... *B60Q 1/1407* (2013.01); *B60Q 1/143* (2013.01); *B60Q 2300/322* (2013.01); *B60Q 2300/41* (2013.01)

(58) Field of Classification Search
CPC ............................. B60Q 1/1407; B60Q 1/143; B60Q 2300/322; B60Q 2300/41
USPC .................................. 362/526, 516, 37, 276
See application file for complete search history.

(56) References Cited

U.S. PATENT DOCUMENTS

| 2001/0012206 A1 | 8/2001 | Hayami et al. | |
|---|---|---|---|
| 2003/0125855 A1* | 7/2003 | Breed | G06K 9/00832 701/36 |
| 2004/0218401 A1* | 11/2004 | Okubo | B60Q 1/085 362/526 |
| 2011/0006684 A1* | 1/2011 | Hodgson | B60Q 3/005 315/77 |
| 2011/0196574 A1* | 8/2011 | Krieg | B60Q 1/143 701/36 |
| 2012/0169240 A1* | 7/2012 | Macfarlane | H02M 1/4225 315/152 |

(Continued)

FOREIGN PATENT DOCUMENTS

| CN | 1306923 A | 8/2001 |
|---|---|---|
| JP | 2009-83835 A | 4/2009 |
| JP | 103192759 A | 7/2013 |

OTHER PUBLICATIONS

Communication dated Jun. 2, 2017 issued by the State Intellectual Property Office of the People's Republic of China in counterpart Chinese Patent Application No. 201610214431.7.

*Primary Examiner* — Douglas W Owens
*Assistant Examiner* — Syed M Kaiser
(74) *Attorney, Agent, or Firm* — Sughrue Mion, PLLC

(57) ABSTRACT

A vehicle lamp comprises a light source, a drive circuit, a CPU, and a gradual varying controller. The drive circuit supplies a driving current to a light source according to a dimming signal. The CPU generates a turn on or off ordering signal that instructs the light source to be turned on or off according to an instruction from a vehicle and information that indicates a driving situation. The gradual varying controller generates the dimming signal that varies gradually with time in response to the turn on or off ordering signal. The vehicle lamp can be switched between a first mode in which the light source is turned off momentarily and a second mode in which the light source is turned off gradually.

10 Claims, 7 Drawing Sheets

(56) References Cited

U.S. PATENT DOCUMENTS

| | | | |
|---|---|---|---|
| 2012/0296567 A1* | 11/2012 | Breed | G01C 21/26 701/468 |
| 2013/0182111 A1* | 7/2013 | Ogasawara | H04N 7/18 348/148 |
| 2013/0271040 A1* | 10/2013 | Chen | H05B 33/0815 315/307 |
| 2013/0321143 A1* | 12/2013 | Boyer | B60Q 1/44 340/463 |
| 2013/0334980 A1* | 12/2013 | Zhou | H05B 33/0845 315/250 |
| 2014/0015410 A1* | 1/2014 | Shibata | B60Q 1/1407 315/82 |
| 2014/0152178 A1 | 6/2014 | Hodgson et al. | |
| 2014/0152826 A1* | 6/2014 | Liken | H04N 7/183 348/148 |
| 2014/0309855 A1* | 10/2014 | Tran | B60Q 1/38 701/36 |
| 2015/0042226 A1* | 2/2015 | Hibino | B60Q 1/085 315/82 |
| 2015/0097666 A1* | 4/2015 | Boyd | G01N 27/02 340/517 |
| 2015/0163871 A1* | 6/2015 | Takeshi | B60Q 11/00 315/82 |
| 2016/0023592 A1* | 1/2016 | Foltin | B60Q 1/143 701/49 |
| 2016/0159272 A1* | 6/2016 | Kataike | B60Q 1/12 315/79 |
| 2016/0221493 A1* | 8/2016 | Okamoto | B60Q 1/26 |
| 2016/0288699 A1* | 10/2016 | Solar | B60Q 1/143 |

\* cited by examiner

302

VEHICLE LAMP

CROSS-REFERENCE TO RELATED APPLICATION

The present application claims the benefit of priority of Japanese Patent Application No. 2015-078686, filed on Apr. 7, 2015, which is incorporated herein by reference.

TECHNICAL FIELD

The present invention relates to a vehicle lamp for use on a motor vehicle.

BACKGROUND ART

The main stream of conventional vehicle lamps has been halogen lamps and HIDs (High Intensity Discharge) lamps. In recent years, however, vehicle lamps have been developed in which a semiconductor light source such as an LED (Light Emitting Diode) or a laser diode (also referred to as a semiconductor laser) is used as a light source.

A vehicle lamp has been developed which includes an additional high beam configured to illuminate an area lying farther than an area to be illuminated by a normal high beam with a view to enhancing the visibility of such a farther area. A laser diode is used as a light source for the additional high beam because high directionality is required on the additional high beam, or a similar semiconductor light source with high luminance is used. Additionally, a light source with high luminance such as a laser diode or an LED is sometimes used for a normal high beam or low beam.

A light source with high luminance causes a problem of dazzling a preceding vehicle and/or a pedestrian while it provides high visibility.

SUMMARY OF THE INVENTION

The present invention has been made in these situations and an illustrative object of an aspect thereof is to provide a vehicle lamp that can control a light source with high luminance as required.

An aspect of the present invention relates to a vehicle lamp. The vehicle lamp includes a light source, a drive circuit configured to supply a driving current according to a dimming signal to the light source, a processor configured to generate a turn on or off ordering signal that signals the light source to be turned on or off according to an instruction from a vehicle and information indicating a driving situation and a gradual varying controller configured to generate the dimming signal that varies with time in response to the turn on or off ordering signal. The vehicle lamp can be switched between a first mode in which the light source is turned off momentarily and a second mode in which the light source is turned off gradually.

The "light source is turned off momentarily" means that the light source is turned off in a time period that is shorter than a time period when the light source is turned off gradually. In the first mode, the driving current of the light source is dropped to a level near zero momentarily so that the quantity of light can be reduced to zero within a short period of time. Because of this, when a situation is detected where a light beam should not be shone or when a sign of the occurrence of such a situation is detected, the first mode can be selected, thereby making it possible to enhance the safety. On the other hand, in the second mode, a sensation of high quality is produced and/or a drastic change in brightness ahead of the vehicle is suppressed by reducing the quantity of light gradually by reducing the driving current of the light source moderately, thereby making it possible to enhance the safety and comfortableness of the driver.

The processor may select the first mode or the second mode according to a cause for turning off the light source.

The information indicating the driving situation may include the presence or absence of a preceding vehicle, and the processor may select the first mode when the light source is turned off as a result of the preceding vehicle being detected. The problem of dazzling a preceding vehicle can be reduced.

The vehicle lamp may include a switch that is provided on a power supply path from a battery to the drive circuit and that is controlled to be turned on or off by the processor. The processor may switch off the switch (i) when the light source is turned off in the first mode and causes the light source to be turned off gradually by the gradual varying controller with the turn on or off ordering signal shifted to a turn off level (ii) when the light source is turned off in the second mode.

The power supply to the drive circuit is cut off by switching off the switch, and no driving current is allowed to flow to the drive circuit, thereby making it possible to drop the quantity of light to zero at once. The vehicle lamp can be switched between the first mode and the second mode also by varying the gradient of the dimming signal by the gradual varying controller. However, compared with this possible configuration, the configuration of the present invention is advantageous in that the switch can be controlled without involving any additional circuitry and control.

The light source may be a laser diode for an additional high beam.

It can be said that it is preferable to turn off momentarily the laser diode when a preceding vehicle or a pedestrian is detected in order to avoid a risk of dazzling them. Consequently, the light source is preferable for use for the vehicle lamp that can be switched between the first mode and the second mode.

The light source may include a plurality of semiconductor light sources for an ADB (Adaptive Driving Beam). ADB denotes a light beam system configured to illuminate a selected portion of a high beam range (and/or a low beam range) and is a type of headlamp that can verify the light distribution pattern of the beam. The processor may turn off a semiconductor light source corresponding to an area that should not be illuminated during driving on a curve in the second mode.

The light distribution pattern varies moderately by controlling the ABD during driving on a curve. As this occurs, the driver may feel a sensation of physical disorder in case the illumination of a certain area in the illumination range is interrupted abruptly. However, the light source corresponding to the area concerned in the illumination range is turned off moderately in the second mode, thereby making it possible to make the driver feel comfortable.

According to the vehicle lamp having at least one of the above described features, it is possible to control the light source with high luminance as required.

DETAILED DESCRIPTION

Figure 1:
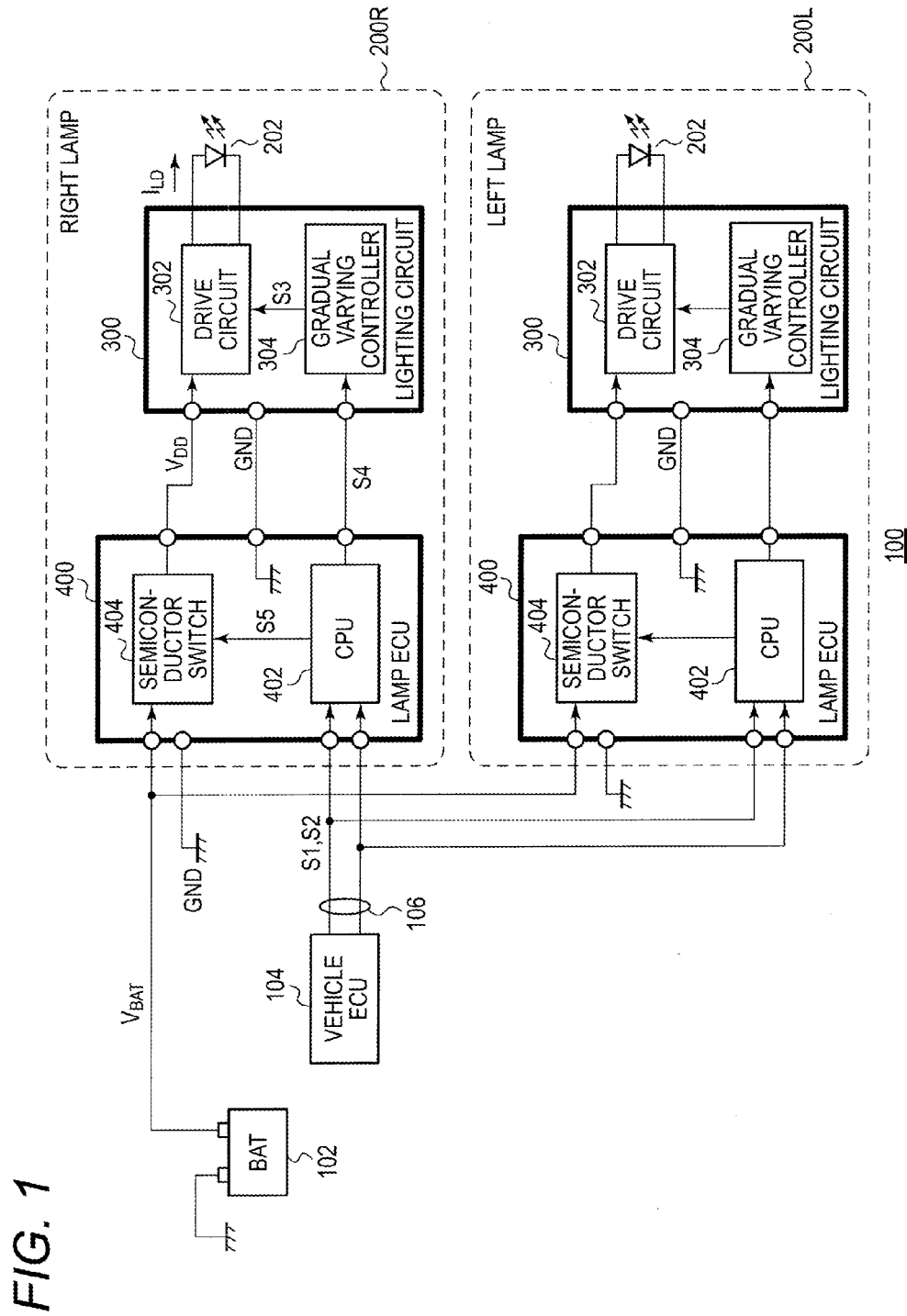
FIG. 1 is a block diagram showing a lamp system including a vehicle lamp according to an embodiment.

Hereinafter, a preferred embodiment of the present invention will be described by reference to the drawings. Like reference numerals will be given to like or similar constituent elements, members and operations shown in the drawings, and the repetition of like or similar descriptions will be omitted as required. The embodiment is not intended to limit the present invention but to illustrate the present invention. All features and combinations thereof that are described in the embodiment are not necessarily essentials to the present invention.

In this specification, a "state in which a member A is connected to a member B" includes not only a case where the member A and the member B are connected together physically directly but also a case where the member A and the member B are connected together indirectly via another member that does not substantially affect the electrical connection between the members or that does not substantially impair a function or effect that would be provided by the connection.

Similarly, a "state in which a member C is provided between a member A and a member B" includes not only a case where the member A and the member C or the member B and the member C are connected together directly but also a case where the member A and the member C or the member B and the member C are connected together indirectly via another member that does not substantially affect the electrical connection between the members or that does not substantially impair a function or effect that would be provided by the connection.

FIG. 1 is a block diagram of a lamp system 100 that includes a vehicle lamp 200 according to an embodiment. The lamp system 100 includes a battery 102, a vehicle ECU 104 and right and left vehicle lamps 200R, 200L.

The vehicle ECU (Electronic Control Unit) 104 is connected individually to the vehicle lamps 200R and 200L via a control line such as a CAN (Controller Area Network) bus 106 so as to control the vehicle lamps 200R, 200L in a consolidated fashion. A turn on command S1 to turn on or off the lamp and information indicating a driving situation (driving information) S2 are transmitted from the ECU 104 to the vehicle lamp 200.

Next, the configuration of the vehicle lamp 200 will be described. Since the right and left vehicle lamps 200 are configured in the same way the suffixes R, L are omitted.

The vehicle lamp 200 includes a light source 202, a lightening circuit 300 and a lamp ECU 400. The vehicle lamp 200 installs a high beam lamp, a low beam lamp and a clearance lamp. In describing the configuration of the vehicle lamp 200, only an additional high beam lamp of the high beam lamp will be described. This additional high beam lamp illuminates particularly a far area ahead of a vehicle.

Although the light source 202 employs a semiconductor laser, other semiconductor light sources having a high directionality can also be used for the light source 202.

The lighting circuit 300 includes a drive circuit 302 and a gradual varying controller 304. The drive circuit 302 supplies a driving current $I_{LD}$ according to a dimming signal S3 to the light source 202. The drive circuit 302 employs preferably a constant current converter that not only supplies a power supply voltage $V_{DD}$ to the light source 202 by raising or lowering the power supply voltage $V_{DD}$ but also stabilizes the driving current $I_{LD}$ that flows to the light source 202 to a target current that matches the dimming signal S3. It is noted that no specific limitation is imposed on the topology of the constant current converter. The drive circuit 302 may employ both an analog dimming that varies the quantity of the driving current $I_{LD}$ and a PWM (Pulse Width Modulation) dimming that varies the duty ratio of the driving current $I_{LD}$ by switching it at high speeds or may employ either of them.

The gradual varying controller 304 generates the dimming signal S3 that changes gradually with time in response to a turn on or off ordering signal S4 from the lamp ECU 400. Specifically, when the turn on or off ordering signal S4 is shifted to a turn on level (for example, a high level), the gradual varying controller 304 causes the dimming signal S3 to vary (for example, increase) moderately with time in a direction in which the driving current $I_{LD}$ increases. Additionally, when the turn on or off ordering signal S4 is shifted to a turn off level (for example, a low level), the gradual varying controller 304 causes the dimming signal S3 to vary (for example, decrease) moderately with time in a direction in which the driving current $I_{LD}$ decreases. A time τ necessary for the dimming signal S3 to be so shifted (a gradual varying time) in a second mode, which will be described later, is preferably in a range of 0.2 to 5 seconds.

Human eyes have an adaptive characteristic to the ambient brightness and hence are more sensitive to a variation in brightness in a darker environment. In the case of increasing moderately the luminance of the lamp (a gradual turning on of the lamp), in the event that the degree of variation in the quantity of light is made smaller when the quantity of light of the lamp is small while the degree of variation in the quantity of light is made greater as the quantity of light of the lamp gets greater, human eyes can accept the gradual turning on of the lamp as a natural thing to them. Similarly, in the case of decreasing moderately the luminance of the lamp (a gradual turning off of the lamp), it is preferable that the degree of variation in the quantity of light is made greater when the quantity of light of the lamp is great while the degree of variation in the quantity of light is made smaller as the quantity of light of the lamp gets smaller.

No specific limitation is imposed on the configuration of the gradual varying controller 304. When the drive circuit 302 receives a voltage signal as the dimming signal S3, the gradual varying controller 304 may include a capacitor and a charging and discharging circuit that charges and discharges the capacitor so that the voltage of the capacitor is used as the dimming signal S3.

The lamp ECU 400 includes a CPU (Central Processing Unit) 420 and a semiconductor switch 404. The CPU 402 generates a turn on or off ordering signal S4 that signals the light source 202 to be turned on or off according to the turn on signal S1 and the driving information S2 that are transmitted from the vehicle ECU 104.

For example, the driving information S2 includes the presence or absence of a preceding vehicle (S2a), vehicle speed (S2b), and steering angle (S2c). The vehicle ECU 400 shifts the turn on or off signal S4 to a turn on level when the turn on command S1 gives an instruction to turn on the lamp with the presence or absence of a preceding vehicle, vehicle speed and steering angle meeting specified conditions.

As an example, the lamp ECU 400 shifts the turn on or off ordering signal S4 to the turn on level when the turn on or off ordering signal S4 is giving an instruction to turn on the lamp and the following conditions are met: (i) no preceding vehicle is detected; (ii) the vehicle speed is equal to or faster than a specified value (80 km/h); and (iii) the steering angle is equal to or smaller than a specified value (for example, five degrees).

Additionally, in the event that at least one of the following conditions: (i) a preceding vehicle is detected; (ii) the vehicle speed is equal to or slower than a specified value (60 km/h); and (iii) the steering angle is equal to or greater than a specified value (for example, 10 degrees) is met while the turn on or off ordering signal S4 is being at the turn on level, the lamp ECU 400 holds the turn on or off ordering signal S4 at the turn on level.

The semiconductor switch 404 is provided on a power supply path from the battery 102 to the drive circuit 302 and is controlled to be on or off according to a control signal S5 from the CPU 402. The semiconductor switch 404 is switched on while the light source 202 is kept turned on.

The vehicle lamp 200 can be switched between the first mode in which the light source 202 is turned off momentarily and the second mode in which the light source 202 is turned off gradually.

The "light source 202 is turned off momentarily" in the first mode means that the light source 202 is turned off within a time period that is shorter than the time period during which the light source is turned off gradually. Specifically speaking, the light source 202 may be turned off in a time period that is shorter than 0.2 second.

The configuration of the lamp system 100 that has been described heretofore is a basic configuration thereof. Next, the operation of the lamp system 100 will be described.

Selecting the first mode can reduce the driving current $I_{LD}$ to the light source 202 down nearly to zero momentarily so that the quantity of light of the light source 202 can be reduced to zero within a short period of time. By selecting the first mode when an object that should not be illuminated with a high beam is detected, safety can be enhanced.

On the other hand, in the second mode, the driving current $I_{LD}$ to the light source 202 is reduced moderately so that the quantity of light of the light source 202 is reduced gradually, thereby making it possible to produce a sensation of high quality and/or to suppress a drastic change in brightness ahead of the vehicle, whereby the safety and comfortableness of the driver can be enhanced.

According to the vehicle lamp 200 of this embodiment, the light source with high luminance can be controlled appropriately. Following this, a mode switching control will be described.

The CPU 402 selects the first mode or the second mode according to a cause for turning off the light source 202. In the example described above, the light source 202 is turned off when at least one of the following conditions is met which include (i) a preceding vehicle is detected; (ii) the vehicle speed is equal to or slower than a specified value (60 km/h); and (iii) the steering angle is equal to or greater than a specified value (for example, 10 degrees). Namely, there are three causes for turning off the light source including (i) a preceding vehicle is detected; (ii) the vehicle speed is equal to or slower than a specified value (60 km/h); and (iii) the steering angle is equal to or greater than a specified value (for example, 10 degrees).

In the case of turning off the light source 202 due to the detection of a preceding vehicle, the CPU 402 selects the first mode. Then, in the case of turning off the light source 202 due to other causes, the CPU 402 selects the second mode. Since the driver of the preceding vehicle is dazzled strongly when the high beam with high luminance is shone on to the preceding vehicle, the dazzling of the driver can be prevented by turning off the light source immediately.

Following this, a method for realizing the first mode and the second mode will be described.

The CPU 402 switches off the semiconductor switch 404 when the light source 202 is turned off in the first mode. The CPU 402 shifts the turn on or off ordering signal S4 to the turn off level and causes the gradual varying controller 304 to turn off the light source 202 gradually when the light source 202 is turned off in the second mode.

An advantage of the method according to this embodiment will be described. As with a first modified example, which will be described later, it is considered that the gradual varying controller 304 is configured to generate two dimming signals S3a, S3b which correspond to the first mode and the second mode. As this occurs, it is necessary that the turn on or off ordering signal S4 instructs the light source 202 to be turned on or off and that the mode to be selected is notified to the gradual varying controller 304 by a signal that is separate from the turn on or off ordering signal S4. Consequently, the configuration of the gradual varying controller 304 and the communication between the CPU 402 and the gradual varying controller 304 become complex. According to the method of the embodiment, the dimming signal S3 that should be generated by the gradual varying controller 304 to turn off the light source 202 gradually should not be more than one, which corresponds to the second mode, and the turn on or off ordering signal S4 only has to instruct the light source 202 to be turned off. Thus, the circuit involved in the method of this embodiment can be simplified.

Figure 2:
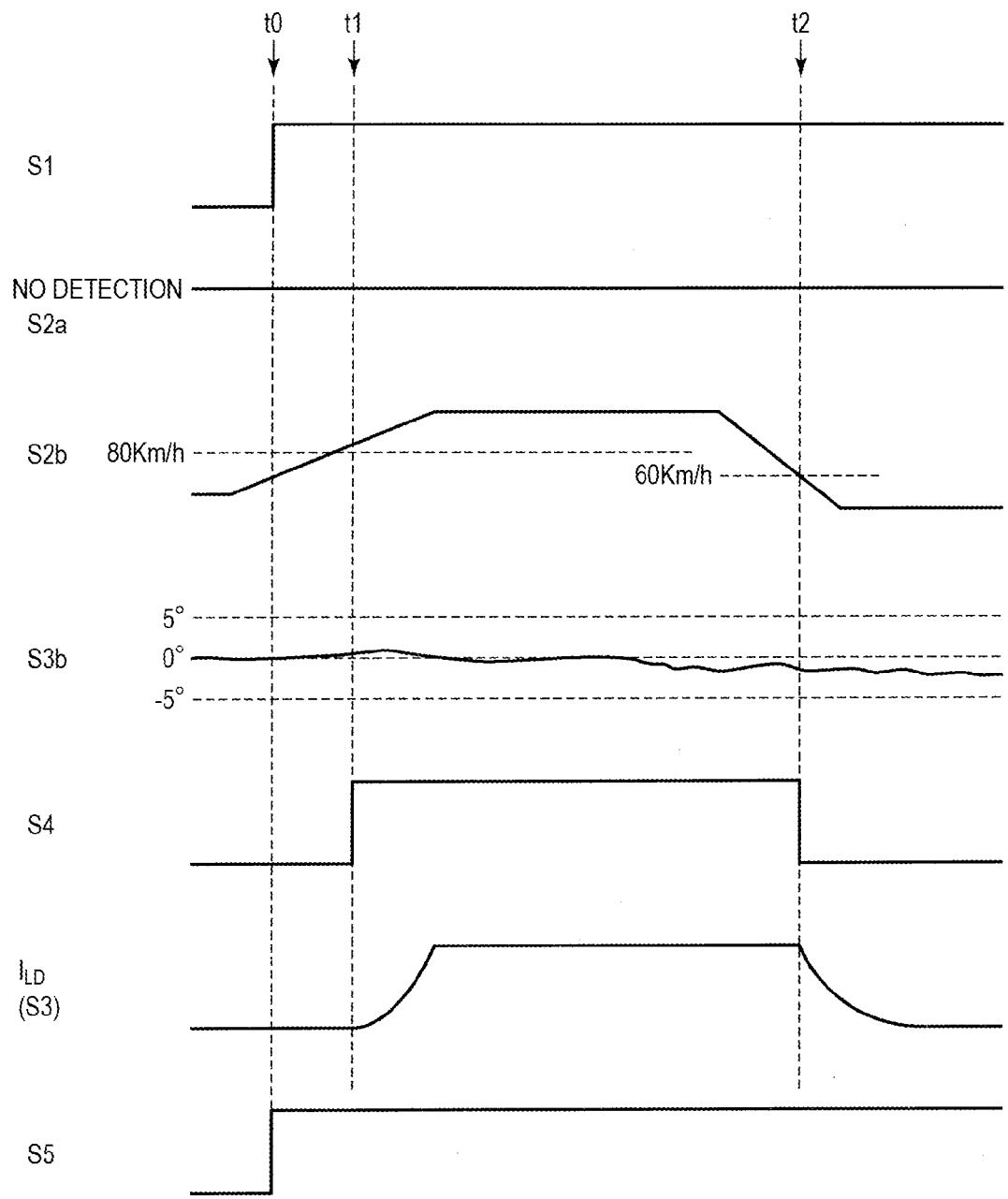
FIG. 2 is an operation waveform diagram of the vehicle lamp in a second mode.

FIG. 2 is an operation waveform diagram of the vehicle lamp 200 in the second mode. The turn on command S1 is shifted to the turn on level at a time t0. In response to this shift of the turn on command S1, the CPU 402 shifts the command signal S5 to a high level to switch on the semiconductor switch 404. The semiconductor switch 404 may be switched on before the turn on command S1 is shifted to the turn on level.

At this point in time, the vehicle speed indicated by the driving information S2b is lower than a threshold (80 km/h), and therefore, the turn on or off ordering signal S4 remains at a low level. When the vehicle speed indicated by the driving information S2b exceeds the threshold (80 km/h) at a time t1, the turn on or off ordering signal S4 is shifted to the high level. In response to this, the gradual varying controller 304 increases the dimming signal S3 with time. As a result, the drive circuit 302 increases the driving current $L_{ID}$ with time, so that the light source 202 is turned on gradually.

The vehicle speed is reduced to be lower than 60 km/h at a time t2. As this occurs, the CPU 402 selects the second mode and shifts the turn on or off ordering signal S4 to a turn off level while keeping the semiconductor switch 404 switched on. In response to the shift of the turn on or off ordering signal S4, the gradual varying controller 304 increases the dimming signal S3 with time. As a result, the drive circuit 302 reduces the driving current $I_{LD}$ with time, so that the light source 202 is turned off gradually.

Figure 3:
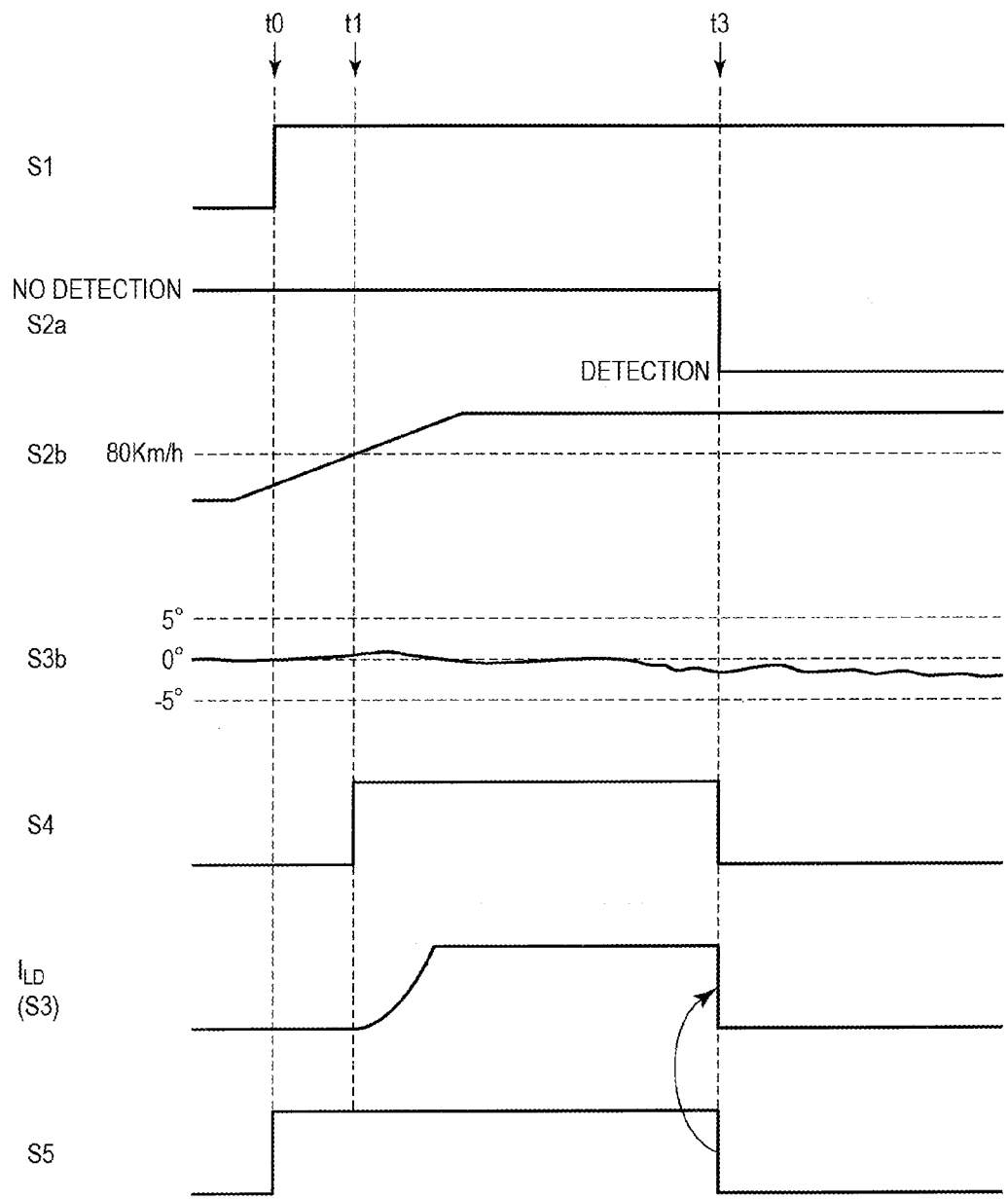
FIG. 3 is an operation waveform diagram of the vehicle lamp in a first mode.

FIG. 3 is an operation waveform diagram of the vehicle lamp 200 in the first mode. Operations from the time t0 to the time t1 are similar to those in FIG. 2. The driving information S2a indicates that a preceding vehicle is detected at a time t3. As this occurs, the CPU 402 selects the first mode and switches the control signal S5 to a low level. This switches off the semiconductor switch 404, and the supply of the power supply voltage $V_{DD}$ to the drive circuit 302 is cut off, whereby the driving current ILD is reduced to zero within a short period time to turn off the light source 202. Although the CPU 402 shifts the turn on or off ordering signal S4 to the turn off level at the time t3, the gradual turning off of the light source 202 by the gradual varying controller 304 is negated because the supply of the power supply voltage $V_{DD}$ thereto is cut off.

Following this, another feature in relation to the control of the semiconductor switch 404 by the CPU 402 will be described. Before starting the description, a problem to be solved thereby will be described.

Figure 4:
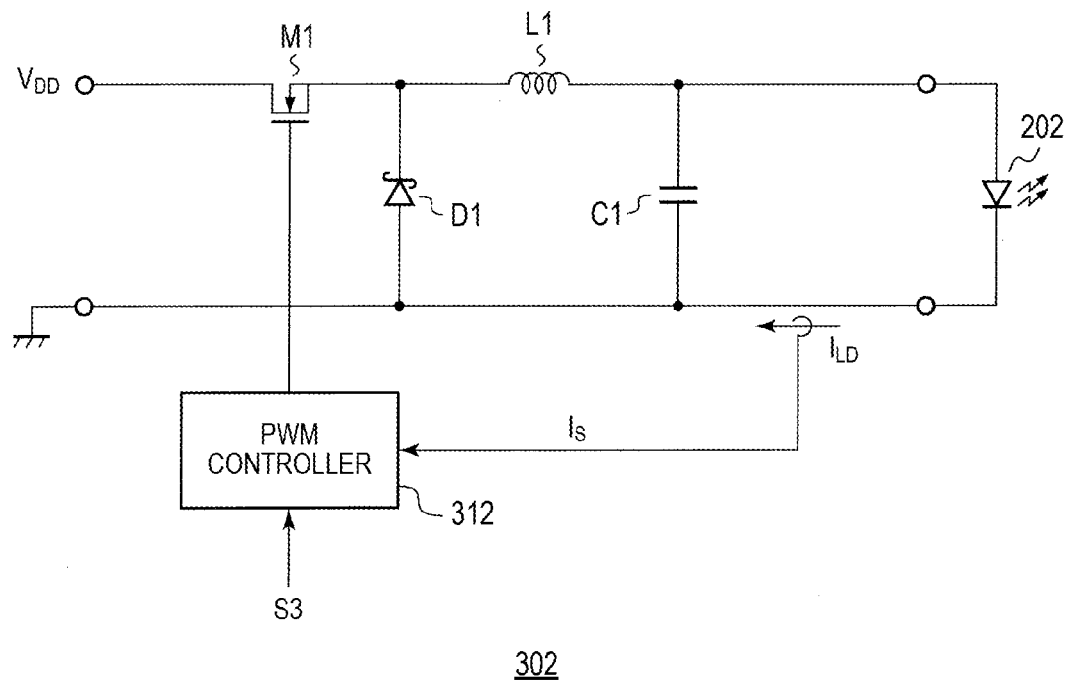
FIG. 4 is a circuit diagram of a constant current converter that is a drive circuit.

FIG. 4 is a circuit diagram of the constant current converter that is the drive circuit 302. This constant current converter is a Buck converter that includes a switching transistor M1, a rectifying device D1, an inductor L1, and a capacitor C1. A converter controller 312 switches on and off the switching transistor M1 so that a detection signal $I_S$ of the driving current $I_{LD}$ coincides with a specified target value. The converter controller 312 feedback controls the duty ratio of the switching transistors M1 through a PWM system or a bang-bang system (a hysteresis control). The topology of the converter is only an example, and hence, a different known configuration may be used.

In the converter configured in the way described above, a case is considered in which the switching transistor M1 fails through short-circuiting. As this occurs, the supply of the driving current $I_{LD}$ to the light source 202 cannot be controlled, resulting in fears that a great magnitude of current flows to the light source 202, whereby a beam that should not be shone is shone or the light source 202 or other circuit elements are badly affected.

A control of the semiconductor switch 404 that will be described below will help solve this problem.

The CPU 402 switches off the semiconductor switch 404 within a specified period of time after the light source 202 is turned off at the latest. In the case of the light source 202 being turned off by turning off the semiconductor switch 404 in the first mode, this condition is satisfied by itself. In the case of the light source 202 being turned off in the second mode, the CPU 402 shifts the turn on or off ordering signal S4 to the turn off level and thereafter switches off the semiconductor switch 404 immediately after the gradual varying time of the dimming signal S3 elapses.

No specific limitation is imposed on the timing at which the semiconductor switch 404 is switched on. For example, the CPU 402 may switches on the semiconductor switch 404 at a timing at which the normal high beam with the additional high beam is instructed to be illuminated. Alternatively, the CPU 402 may switch on the semiconductor switch 404 at the same as or immediately before the CPU 402 shifts the turn on or off signal S4 to the turn on level.

Figure 5:
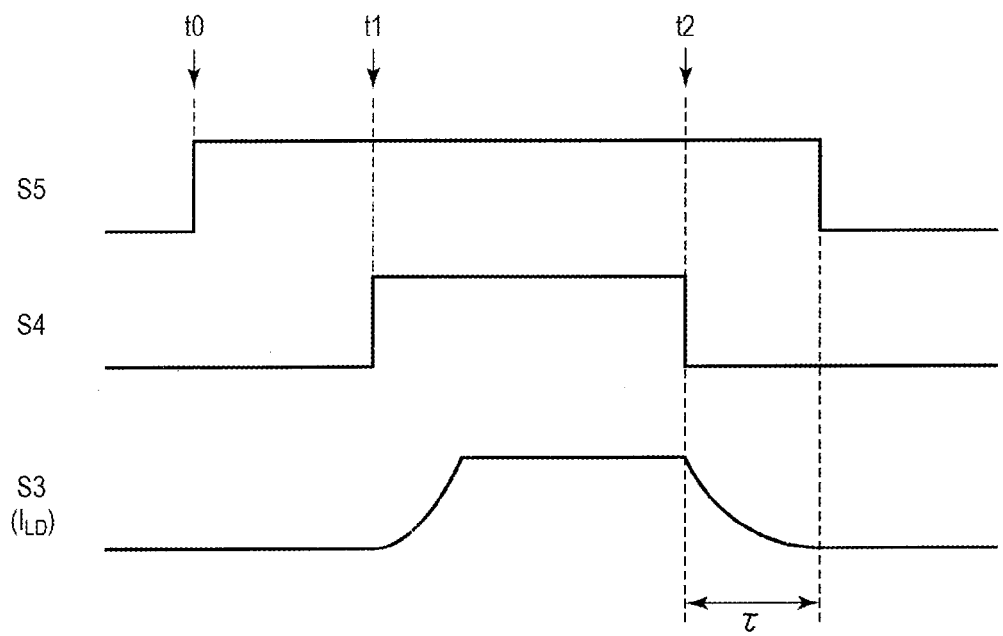
FIG. 5 is a waveform diagram showing a control of a semiconductor switch.

FIG. 5 is a waveform diagram showing a control of the semiconductor switch 404. The waveform diagram shows a control that is carried out in the second mode. When the normal high beam is illuminated at a time t0, the CPU 402 shifts the control signal S5 to the high level and switches on the semiconductor switch 404. The normal high beam may be instructed to be illuminated manually by the driver or an automatic high beam control may be adopted in which the vehicle automatically controls the turning on or off of the lamp.

The lighting conditions of the additional high beam light source 202 are not satisfied at the time t0. When the lighting conditions of the light source 202 are satisfied at a time t1, the turn on or off signal S4 is shifted to the turn on level. This causes the dimming signal S3 to increase with time, whereby the driving current $I_{LD}$ increases moderately, causing the light source 202 to be turned on gradually.

When the vehicle speed is reduced at a time t2, the lighting conditions of the additional high beam are not satisfied. Then, the CPU 402 shifts the turn on or off ordering signal S4 to the turn off level and selects the second mode. The gradual varying controller 304 reduces the dimming signal S3 moderately, and the light source 202 is turned off gradually. Then, the control signal S5 is shifted to the low level immediately after the varying time T elapses, and the semiconductor switch 404 is switched off.

As a comparable technique, let's suppose that a control is carried out in which the semiconductor switch 404 is normally on irrespective of the fact that the light source 202 is turned on or off. Then, in case the semiconductor switch 404 fails due to short-circuiting, the light source 202 is turned on although the turn on command S1 or the turn on or off ordering signal S4 is at the turn off level.

Even though the comparable technique installs a protection function in which when the failure of the semiconductor switch 404 is detected, the turn on or off ordering signal S4 is shifted to the turn off level and the light source 202 is controlled to be turned off, with the semiconductor switch 404 left failing due to short-circuiting, the light source 202 is energized.

Further, there may be a case where the light source 202 is configured by a combination of a blue semiconductor laser and a luminescent material that is excited by the semiconductor laser. In case a position error or deterioration (luminescent material abnormality) is caused in the luminescent material, light emitted from the semiconductor laser is emitted directly without being diffused by the luminescent material, causing a problem. Even though the comparable technique installs the projection function to turn off the light source 202 when the luminescent material abnormality is detected, with the semiconductor switch 404 left failing due to short-circuiting, the light source 202 is energized.

In contrast with this, according to the control illustrated in FIG. 5, the semiconductor switch 404 is energized only a minimum required period of time, and the semiconductor switch 404 is switched off after the light source 202 is instructed to be turned off so that the light source 202 is energized no more in an ensured fashion. Consequently, the problem inherent in the comparable technique can be solved.

The embodiment described above only illustrates the principle and application of the present invention, and hence, many modified examples or variations in relation to arrangement may be admitted without departing from the thought of the present invention defined by present inventions claimed hereafter.

First Modified Example

The mode switching control is not limited to the one described in the embodiment.

In a first modified example, the gradual varying controller 304 is configured so as to generate two dimming signals S3a, S3b that correspond to the first mode and the second mode, respectively. The dimming signal S3a that corresponds to the first mode should be the signal shifted immediately to the turn on or off when ordering signal S4 is shifted to the turn off level. Then, the CPU 402 gives an instruction to turn on or off the light source 202 via the turn on or off ordering signal S4 and informs the gradual varying controller 304 of the mode selected via a signal separate from the turn on or off ordering signal S4. With this modified example, the light source 202 can be switched between the plurality of modes.

Second Modified Example

In the embodiment, the light source 202 is switched between the first mode and the second mode. However, the light source 202 may be switched among modes more than two. In other words, the processor may vary the gradual varying time in the second mode according to a cause for turning off the light source. For example, when a preceding vehicle is detected, the first mode is selected. Then, when the light source 202 is turned off based on a reduction in vehicle speed, a second mode with a short gradual varying time is selected, and when the light source 202 is turned off based on the steering angle, a second mode with a long gradual varying time is selected. By adopting this configuration, the mode switching control can be carried out more appropriately according to the situation of the vehicle.

Third Modified Example

In the embodiment, the driving information S2 that is inputted into the CPU 402 is described as including the vehicle speed, the presence or absence of a preceding vehicle and the steering angle. However, in addition to them, the presence or absence of a pedestrian, information from a car navigation system, information (pitch, roll, yaw) from an acceleration sensor or a gyro-sensor, and whether a door is opened or closed may be considered as the driving information S2. Then, any one or any combination of these pieces of information can be used as the driving information S2. The cause for turning off the light source 202 in the first mode is not limited to the detection of a preceding vehicle.

Fourth Modified Example

In the embodiment, the light source 202 is described as being applied to the light source of the additional high beam. However, the light source 202 can also be applied to a high beam that is ADB controlled. A block diagram of a vehicle lamp 200 according to this modified example is similar to the block diagram shown in FIG. 1.

Figure 6:
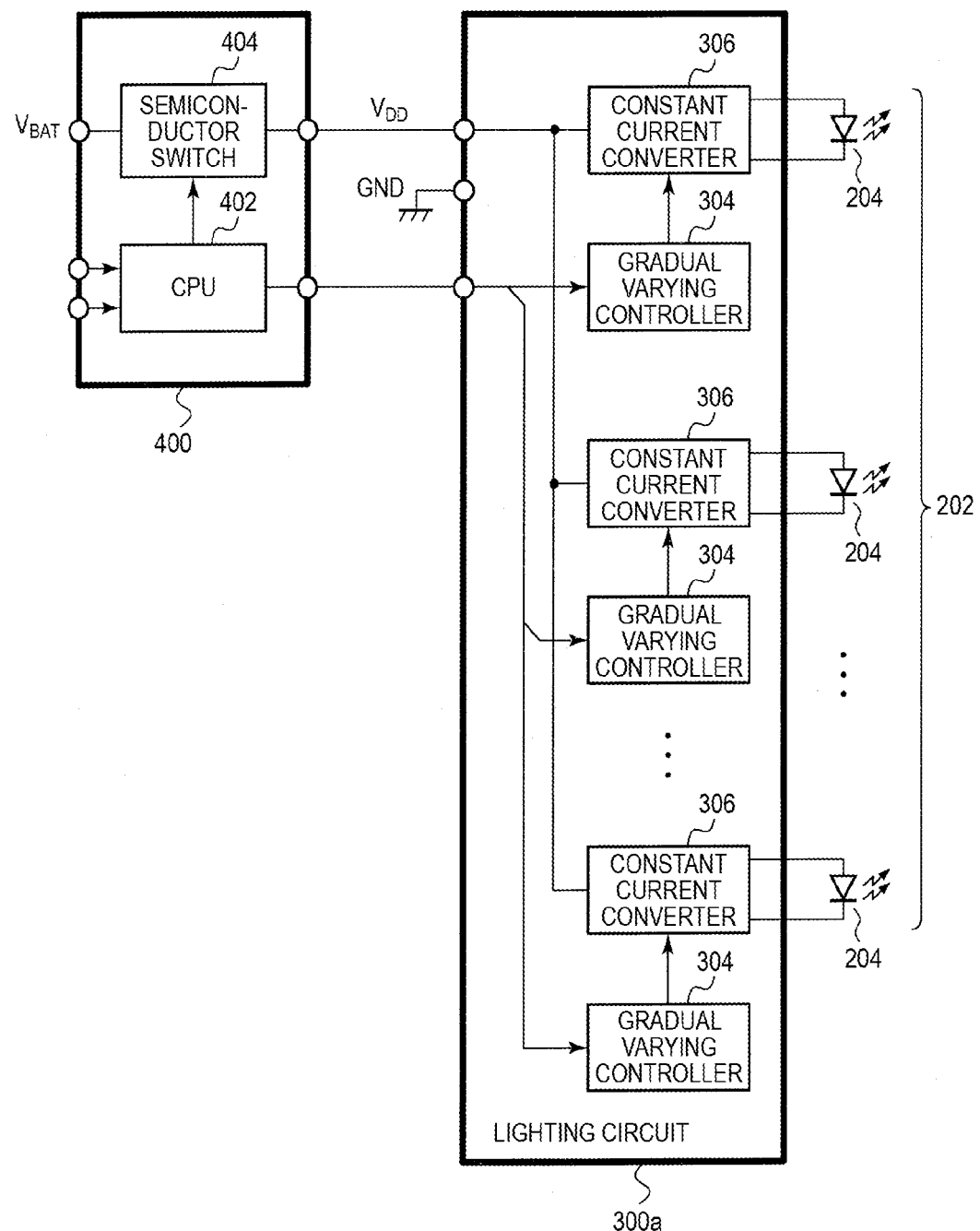
FIG. 6 is a block diagram of a vehicle lamp according to a fourth modified example.

FIG. 6 is a block diagram of a vehicle lamp 200a according to the fourth modified example. A light source 202 includes a plurality of ADB semiconductor light sources (for example, LEDs) 204 which can individually be turned on and off.

A lighting circuit 300a may include constant current converters 306 that are provided individually for the corresponding LEDs 204. Additionally, gradual varying controllers 304 are provided individually for the corresponding constant current converters 306.

In the ABD, the vehicle ECU 104 generates a high beam light distribution pattern to be formed ahead of the vehicle based on an image from a camera and transmits a pattern command that indicates the light distribution pattern generated to a CPU 404.

The CPU 402 controls individually the plurality of LEDs 240 so as to be turned on or off based on the pattern command. In this modified example, too, in turning off the LEDs 204, the LEDs 204 can be switched between a first mode and a second mode. In the embodiment, the semiconductor switch 404 is switched off in the first mode. However, in this modified example, in case a semiconductor switch 404 is switched off, all the LEDs 204 are turned off momentarily. Consequently, in this modified example, as in the first modified example, the gradual varying controllers 304 can each generate a dimming signal S3a that corresponds to the first mode and that is shifted abruptly and a dimming signal S3b that corresponds to the second mode and that is shifted moderately. The CPU 402 informs the gradual varying controllers 304 of the mode selected in turning off the LEDs 204.

For example, in the event that a preceding vehicle is detected in an area that corresponds to a certain LED 204 of the LEDs 204, the CPU 402 turns off the LED 204 concerned in the first mode. In the event that the CPU 402 turns off the LED 204 concerned due to a different cause, the CPU 402 turns off the LED 204 concerned in the second mode. As a preferred example, in the event that an area that should not be illuminated moves during driving on a curve or that a new area that should not be illuminated arises, the LED 204 that corresponds to the area may be turned off in the second mode. The light distribution pattern that is ADB controlled varies moderately during driving on a curve. As this occurs, in case the LED 204 corresponding to a certain area is turned off abruptly, the driver is caused to feel a sensation of physical disorder. However, in this modified example, the LED 204 is turned off moderately in the second mode, whereby the driver is allowed to feel comfortable.

Fifth Modified Example

Figure 7:
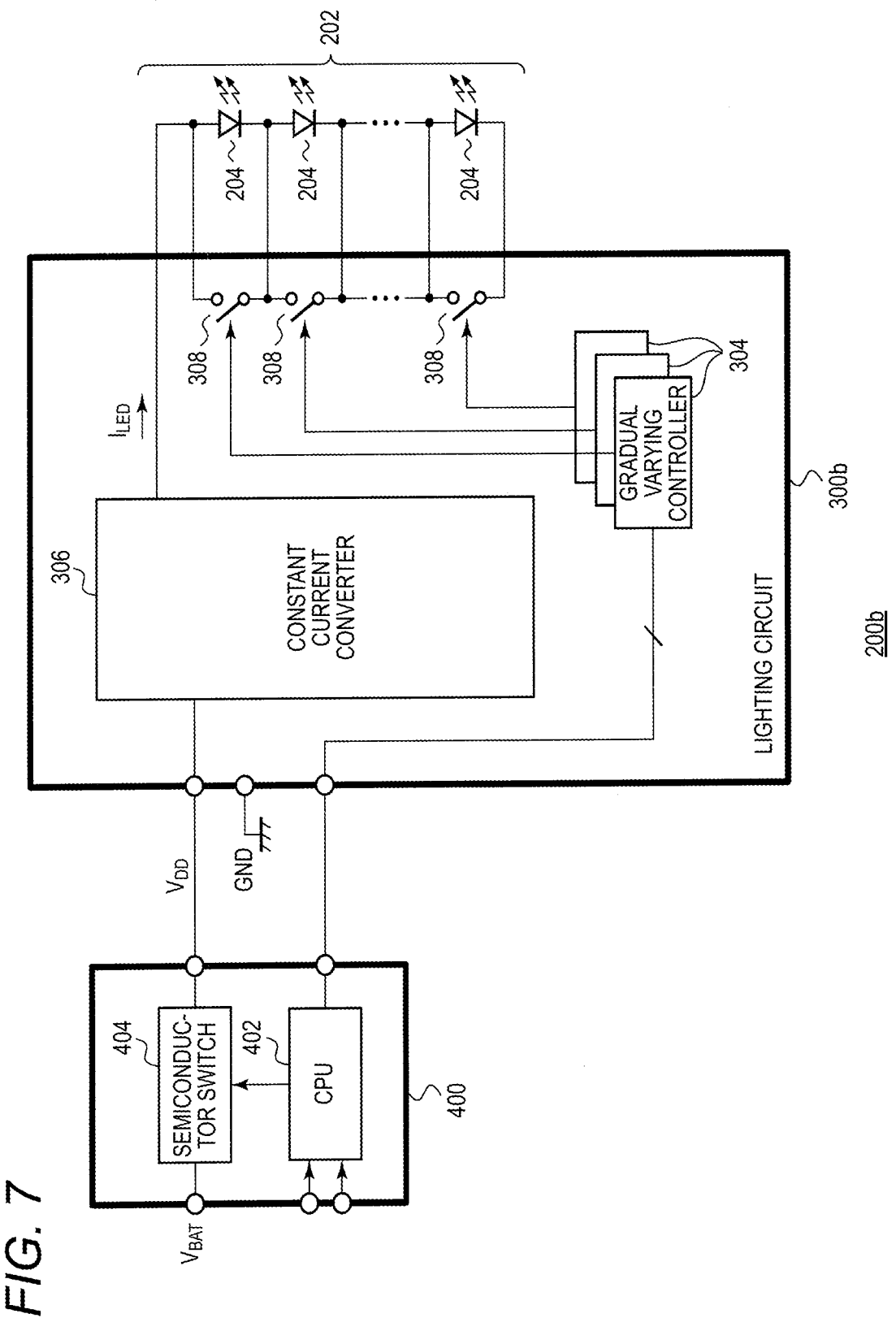
FIG. 7 is a block diagram of a vehicle lamp according to a fifth modified example.

FIG. 7 is a block diagram of a vehicle lamp 200b according to a fifth modified example. This vehicle lamp 200b also has an ADB function as in the case with the vehicle lamp 200a shown in FIG. 6. A plurality of LEDs 204 are connected in series. A constant current converter 306 that is a drive circuit supplies a driving current $I_{LED}$ to a series connection (202) of the plurality of LEDs 204. Bypass switches 308 and gradual varying controllers 304 are provided parallel so as to correspond individually to the LEDs 204.

The gradual varying controller 304 varies gradually an ON resistor of the corresponding bypass switch 308 or varies a duty ratio of switching thereof so as to turn on or off the corresponding LED 204 gradually. The operation of the vehicle lamp 200b is similar to that of the vehicle lamp 200a shown in FIG. 6.

Figure 8:
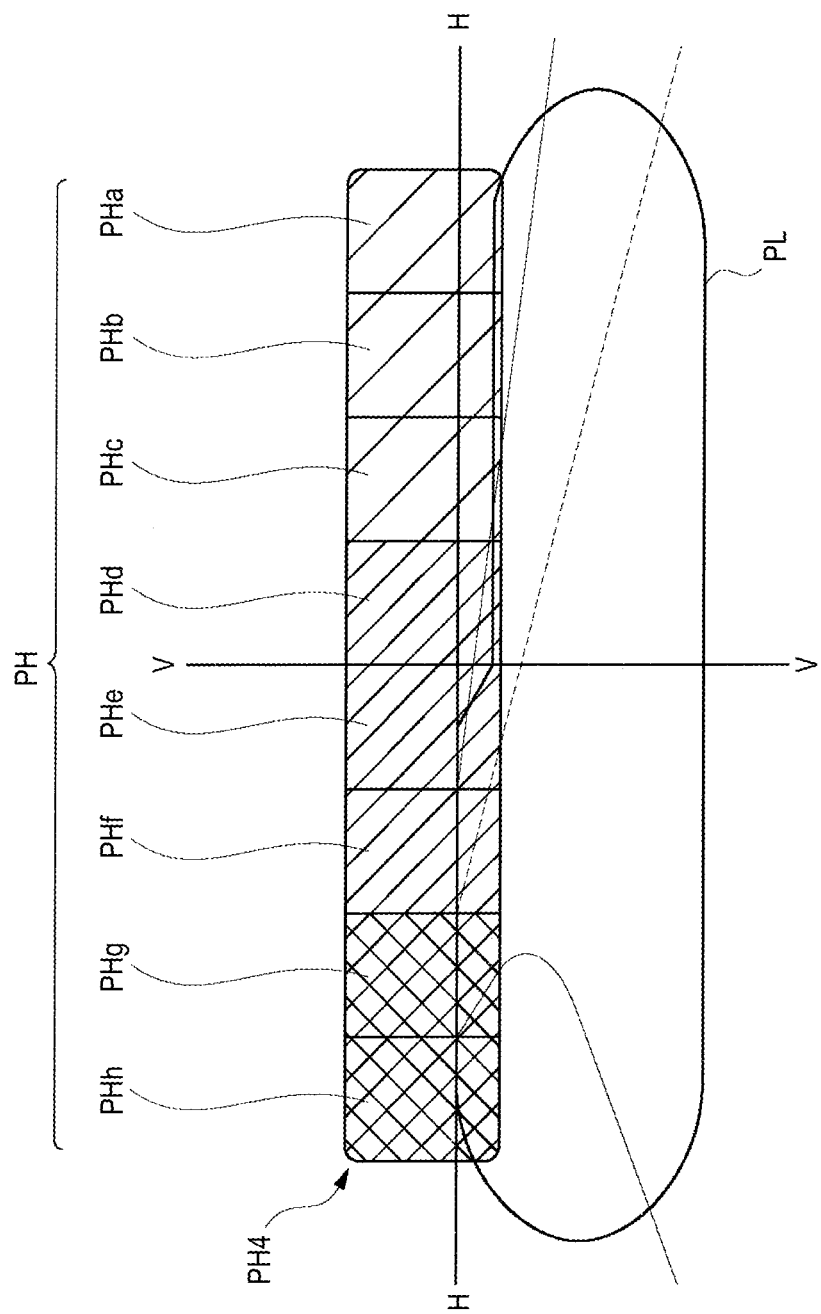
FIG. 8 is a diagram showing schematically light distribution patterns that the vehicle lamps according to the fourth and fifth modified examples form.

FIG. 8 is a diagram showing schematically light distribution patterns that are formed by the vehicle lamps according to the fourth modified example and the fifth modified example.

A light distribution pattern PH4 is divided into a plurality of (here, eight) switching partial areas PHa to PHh, and the switching partial areas are associated individually with the plurality of LEDs 204. In the event that information corresponding to a forward situation captured by the camera indicates that a curved path (a curve) is present ahead of the vehicle, the vehicle ECU 104 controls the vehicle lamps 200L, 200R to switch the light distribution pattern that they form from the normal high beam light distribution pattern used until then to the curved path light distribution pattern PH4.

Then, the vehicle ECU 104 controls the LEDs 204 that correspond to the plurality of switching partial areas (PHa, PHb, PHc, PHg, PHh) that make up the curved path light distribution pattern PH4 as follows. The vehicle ECU 104 controls the LEDs 204 that illuminate a first switching partial areas PHg, PHh that correspond to a left-hand side area of the curved path light distribution pattern PH4 that lies in a direction in which the curved path curves (here, left-curve) so as to increase the brightness of the first switching partial areas PHg, PHh. The vehicle ECU 104 controls the LEDs 204 that illuminate a second switching partial areas PHa, PHb, PHc that correspond to a right-hand side area of the curved path light distribution pattern PH4 that lies on an opposite side to the area that lies in a direction in which the curved path curves, PHh lie so as to decrease the brightness of the second switching partial areas PHa, PHb. PHc.

The CPU 402 turns off the LEDs 204 that correspond to the areas (PHa, PHb, PHc) that should not be illuminated during driving on the curve in the second mode. The light distribution pattern that is ADB controlled varies moderately during driving on a curve. As this occurs, in case the LED 204 corresponding to a certain area is turned off abruptly, the driver is caused to feel a sensation of physical disorder. However, in these modified examples, the LEDs 204 are turned off moderately in the second mode, whereby the comfortableness and safety of the driver can be enhanced.

Sixth Modified Example

In the embodiment, the CPU 402 is described as selecting the modes. However, the present invention is not limited thereto. Hence, the vehicle ECU 104 may select the modes.

Seventh Modified Example

In the embodiment, the light source 202 is described as being used for the additional high beam. However, the present invention is not limited thereto. The light source 202 can be used for a light source for the normal high beam that illuminates a high beam range. The light source 202 can also be used for a light source for illuminating at least part of the high beam range. Alternatively, the light source 202 can also be used for a light source for a low beam.

The embodiment described above only illustrates the principle and application of the present invention, and hence, many modified examples or variations in relation to arrangement may be admitted without departing from the thought of the present invention defined by present inventions claimed hereafter.

The invention claimed is:

1. A vehicle lamp comprising:
   a light source;
   a drive circuit configured to supply a driving current according to a dimming signal to the light source;
   a processor configured to generate a turn on or off ordering signal that signals the light source to be turned on or off according to an instruction from the vehicle and information indicating a driving situation;
   a gradual varying controller configured to generate the dimming signal that varies with time in response to the turn on or off ordering signal;
   a switch provided on a power supply path from a battery to the drive circuit and controlled to be turned on or off by the processor, wherein the processor switches between a first mode in which the light source is turned off momentarily and a second mode in which the light source is turned off gradually, and wherein the processor switches off the switch (i) when the light source is turned off in the first mode and causes the light source to be turned off gradually by the gradual varying controller with the turn on or off ordering signal shifted to a turn off level (ii) when the light source is turned off in the second mode.

2. The vehicle lamp according to claim 1, wherein
   the processor selects the first mode or the second mode according to a cause for turning off the light source.

3. The vehicle lamp according to claim 2, wherein
   the information indicating the driving situation includes presence or absence of a preceding vehicle, and wherein
   the processor selects the first mode when the light source is turned off as a result of the preceding vehicle being detected.

4. The vehicle lamp according to claim 1, wherein
   the light source is a laser diode for an additional high beam.

5. The vehicle lamp according to claim 1, wherein
   the light source includes a plurality of semiconductor light sources for an Adaptive Driving Beam (ADB), and wherein
   the processor turns off a semiconductor light source corresponding to an area that should not be illuminated during driving on a curve in the second mode.

6. A vehicle lamp comprising:
   a light source;
   a drive circuit configured to supply a driving current according to a dimming signal to the light source;
   a processor configured to generate a turn on or off ordering signal that signals the light source to be turned on or off according to an instruction from the vehicle and information indicating a driving situation; and
   a gradual varying controller configured to generate the dimming signal that varies with time in response to the turn on or off ordering signal, wherein
   the processor is configured to turn off the light source in a first mode in which the light source is turned off in a first time period and to control the gradual varying controller to turn off the light source in a second mode in which the light source is turned off in a second time period longer than the first time period.

7. The vehicle lamp according to claim 6, wherein
   the processor is configured to determine to turn off the light source at a first driving situation and to determine to turn off the light source at a second driving situation different from the first driving situation, and wherein
   the processor is configured to turn off the light source in the first mode if the processor determines to turn off the light source at the first driving situation and to turn off the light source in the second mode if the processor determines to turn off the light source at the second driving situation.

8. The vehicle lamp according to claim 6, wherein
   the processor selects the first mode or the second mode according to a cause for turning off the light source.

9. The vehicle lamp according to claim 8, wherein the processor selects the first mode when the light source is turned off as a result of the preceding vehicle being detected.

10. The vehicle lamp according to claim 6, wherein the light source is a laser diode for an additional high beam.

* * * * *